INVENTOR.
BUDDIE J. PINE
BY
Donald E. Renner

INVENTOR.
BUDDIE J. PINE
BY
Arnold E. Renner

INVENTOR.
BUDDIE J. PINE
BY
Arnold E. Renner

INVENTOR.
BUDDIE J. PINE
BY
Arnold C. Renner

INVENTOR.
BUDDIE J. PINE
BY
Arnold E. Renner

INVENTOR.
BUDDIE J. PINE
BY
Arnold E. Renner

INVENTOR.
BUDDIE J. PINE
BY

United States Patent Office 3,351,913
Patented Nov. 7, 1967

3,351,913
MEMORY SYSTEM INCLUDING MEANS FOR SELECTIVELY ALTERING OR NOT ALTERING RESTORED DATA

Buddie J. Pine, Phoenix, Ariz., assignor to General Electric Company, a corporation of New York Filed Oct. 21, 1964, Ser. No. 405,471
7 Claims. (Cl. 340—172.5)

ABSTRACT OF THE DISCLOSURE

Disclosed herein is a memory system for a data processing system in which data is delivered from a core stack and is placed into a temporary holding register. From this register, data may be supplied to a processing unit for the manipulation thereof. There is also provided, from this register, a path back into the memory core stack by which the data as originally derived from the stack may be restored thereto. Alternatively, there is provided a path from this register to a data modifying means and from this means directly back into the memory without once again passing through the temporary holding register.

The present invention relates generally to electronic data processing and more particularly to a scheme for reading information from memory, supplying this information to a central processor and writing this information back into memory in either its original form or after having first been acted upon by a data modifying means such as an arithmetic unit.

In the field of data processing one widely used main memory comprises a large number of memory cells each of which contains or stores a data unit. One common implementation of such a memory includes a three dimensional array of toroidal magnetic cores, each possessing a susbtantially rectangular hysteresis loop such that each of the cores has two stable states. A plurality of individual cores constitutes a memory cell. Each of the cells of the main memory is selectively addressable. Upon addressing one of these cells, the data unit contained or stored within the addressed cell is read from the main memory into a temporary memory or register, including a number of bistable elements corresponding to the number of cores in a cell, from which subsequent transfers are effected in the utilization of the data unit.

For the sake of clarity in the ensuing discussion, the term memory used alone shall designate the main memory and the aforementioned temporary memory or register shall be called the M-register.

In the majority of electronic data processing systems there are two basic types of operation or cycles utilizing the memory. The first of these is the read-restore cycle, in which a data unit is read from memory and then restored to memory in its original form, and the second is the read-compute-write cycle in which a data unit is read from memory, modified, and the data unit as modified is placed back into the memory. In the read-restore cycle customary in the prior art, a unit of data is brought from the memory to the M-register. From the M-register, the information is transferred to the central processor for use and is simultaneously restored to the memory in the cell from which it was taken. In prior art read-compute-write cycles, the unit of data is taken from the memory, placed into the M-register and from there transferred to a data modifying means such as an arithmetic unit where some modification is performed on the data. This modification might be, for example, add one, increment by one, subtract one, a complete substitution of a new data unit, or any of several other arithmetic or logical operations.

After the data has been operated upon by the data modifying means, the information is transferred back into the M-register and from there into the memory cell from whence the original data came. This use of the M-register, as both an input and output register to the memory, results in a race condition; that is, accurate timing is essential to preclude the possibility of an attempt to simultanenously read from and write into the M-register.

The most common prior art method of solving the race condition at the M-register utilizes a second register often referred to as a memory buffer register which is placed between the M-register and the data modifying means (arithmetic unit). In this latter method, a data unit is transferred from the memory to the M-register, from the M-register to the buffer register and from there to the data modifying means. After being modified, the data unit is transferred back to the memory through the M-register. While this system using the buffer register has proven to be fairly satisfactory, it suffers from at least two shortcomings. The first shortcoming of this system is that the word time, i.e., the elapsed time between the removal of a data unit from the memory and the reinsertion of that unit, after modification, back into the memory, is necessarily long because of the extra step of transferring the data through the buffer register. The second shortcoming concerns the additional apparatus required by this system. This apparatus includes the buffer register as well as its associated logic circuitry. In any system, the M-register must be reset before each insertion of data thereinto. Thus, the M-register in this system must be reset twice during each word time, once before a data unit is brought from memory and again before the data unit is reinserted in memory. This double resetting of the M-register further increases the amount of apparatus needed.

The present invention overcomes these shortcomings of the prior art by providing two separate and distinct return paths to the memory. The first of these paths extends from the M-register to the main memory in a manner very similar to that of the prior art. The second return path to memory is from the data modifying means to the memory without the necessity of again transferring the data unit through the M-register. Thus, by the instant invention, the data unit is not placed in the M-register prior to its reinsertion into the memory after being acted upon by the data modifying means and the race condition associated with the prior art systems does not exist. With the elimination of the race condition, the need for the buffer register is alleviated. The absence of this component and its related logic circuitry results in a less expensive system. A further reduction in system cost is effected at the M-register which need be reset only once during each word time. As well as resulting in a savings in apparatus cost, the present invention results in a savings of time over the prior art system embodying a buffer register. The elimination of the buffer register removes several logic levels from the entire memory system, the use of which requires a certain finite time, and thus permits a shorter period of time between sequential accesses to the memory.

It is, therefore, an object of the present invention to provide a data processing system of the type including an addressable memory, embodying an improved system for returning data to that memory.

A further object is to provide an improved memory system, for use in a data processing system, which includes two distinct data return paths to memory.

Another object is to provide an improved memory system including a first path for returning data to memory in unaltered form and a second path including a data modifying means for returning data to memory in altered form.

Still another object is to provide an improved memory system, including two data return paths, which is faster in operation and which employs less apparatus than those memory systems presently known in the art.

The implementation of the present invention includes a main memory which is comprised of a plurality of cells each of which is selectively addressable and each of which is capable of storing one data unit. A temporary memory or M-register is also provided into which data is transferred upon its being read from the main memory.

Two paths are provided, connecting the temporary memory with the main memory, for returning data to the main memory. The first of these paths connects the M-register directly with circuits which effect the writing of data into the main memory. This path is utilized in the read-restore cycle. The second path includes an arithmetic unit or other data modifying means and, as has been previously stated, is utilized in a read-compute-write cycle. In this operation, a data unit is transferred from the main memory to the M-register and thence to the arithmetic unit and from the arithmetic unit to the main memory. Suitable logic for effecting the transfer of the data units from one to the other of the various above components, as well as logic for effecting which of the two separate paths is to be utilized in a particular instance, is also provided.

Further objects and advantages of the invention will become apparent as the following description proceeds and features of novelty which characterize the invention will be pointed out in particularity in the claims affixed to and forming a part of this specification.

For a better understanding of the invention, reference is made to the accompanying drawings in which:

FIG. 1 is a block diagram of a typical prior art memory system including a M-register and a buffer register in which all data flowing to and from the memory passes through the M-register;

FIGS. 2*a* and 2*b* are timing diagrams useful in the explanation and understanding of the operation of the prior art system of FIG. 1;

In the subsequent discussion, the invention, as well as the prior art, is described with respect to block diagrams. The individual components of the system of the present invention are not, per se, novel and the logic connecting these various components is standard prior art logic. The present invention resides in the specific arrangement and concept of interconnecting these standard parts to provide a new and novel memory system which utilizes less components than systems of the prior art, resulting in a faster, less expensive memory system.

As an example of the use of standard components, the main memory may be of the three dimensional core type previously described and of the type in which the addressing of a particular data cell, both in the read and write modes, may be by the coincident current method. Further, the memory may employ an inhibit winding which, during the write operation, determines which of the cores are to be switched. It is, however, to be expressly understood that the above type memory is only representative and that any suitable memory can be used in the utilization and with the system of the present invention.

Figure 3:
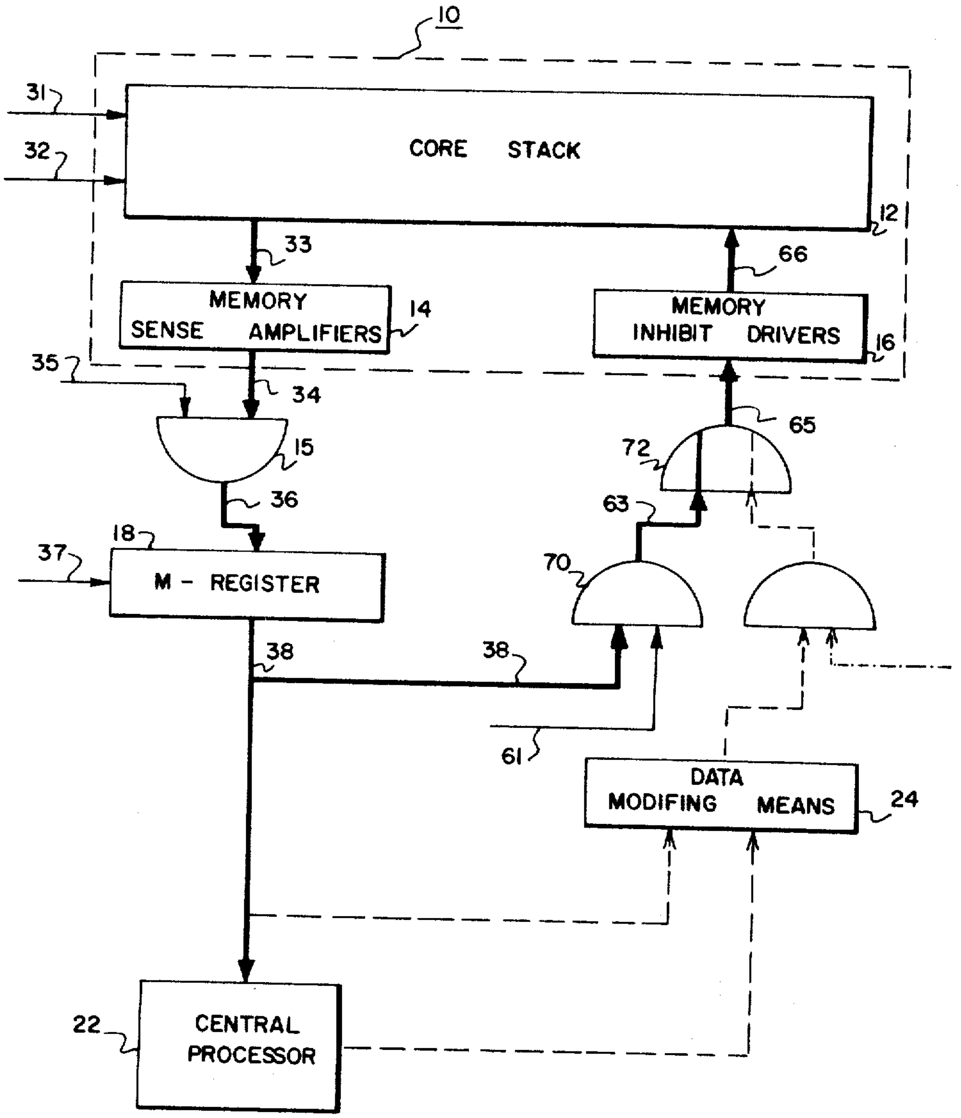
FIG. 3 is a block diagram of the memory system of the present invention illustrating its operation in a read-restore cycle.
Figure 5:
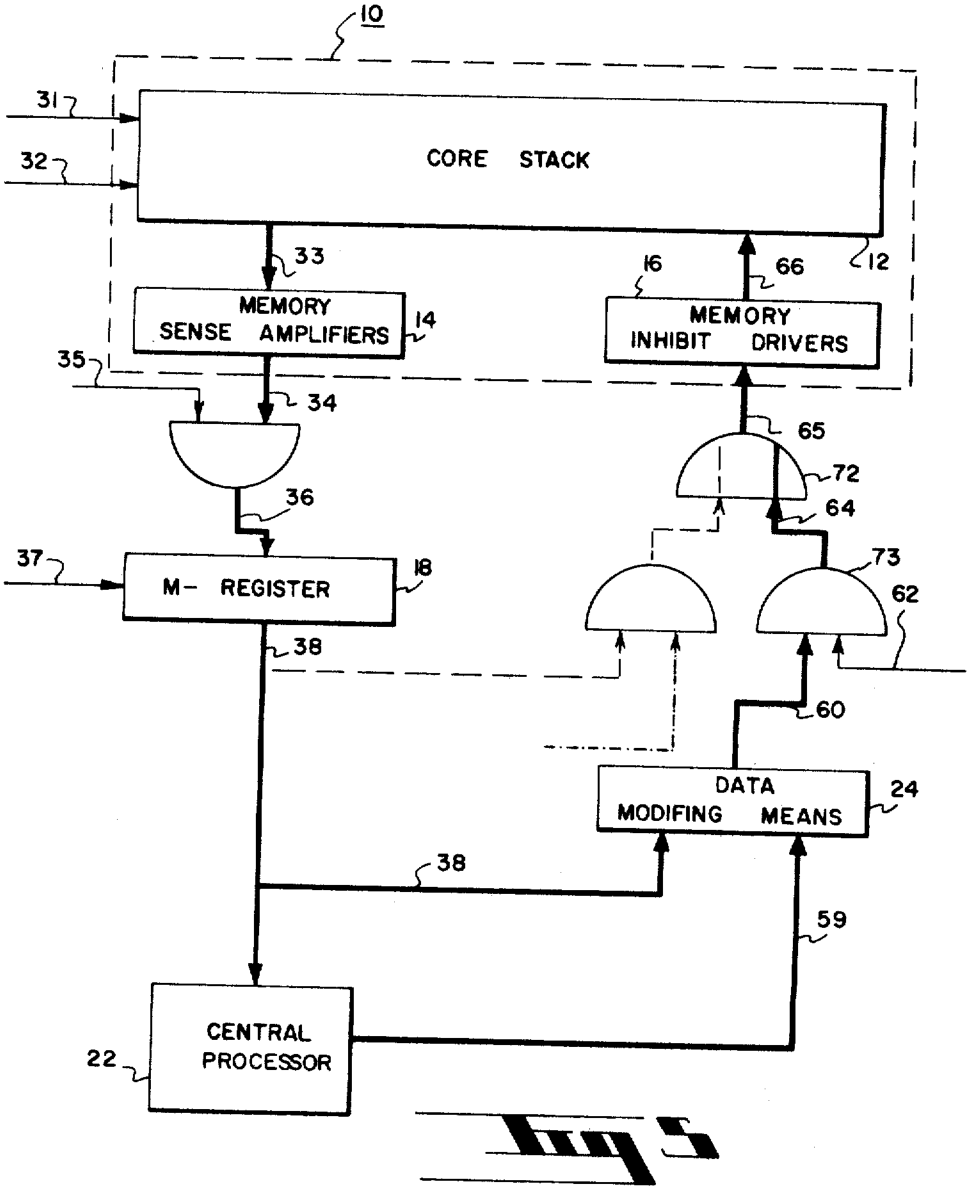
FIG. 5 is a block diagram of the memory system of the present invention illustrating its operation in the read-compute-write cycle.

In the ensuing discussion, both of the prior art and of the present invention, the following designations will be used. The heavier lines connecting the various components and logic levels represent the actual data flow while the lesser lines indicate control signals. In FIGS. 3 and 5, which represent the two modes of operation of the present invention, data flow lines which are not utilized during the particular mode of operation being illustrated are shown by dash lines while control signal lines not being utilized are shown as dot-dash lines. It is also to be understood that the logic shown is to be representative and not actual. For example, the drawings illustrate only a single line connected to a single AND-gate. This is representative of the entire system in that each of these represents several lines and logic elements. If the system utilizes a 18 bit word, there would be 18 such lines connecting 18 such AND-gates. It is also noted that the several control signals utilized throughout the subsequent description are not inclusive of a source of origin. These signals are provided as a portion of the total system and emanate from the central processor timing and logic in a manner which is well known in the art. Inasmuch as the actual generation and formulation of these signals form no part of the present invention, it is not deemed necessary to here show their origination.

Figure 1:
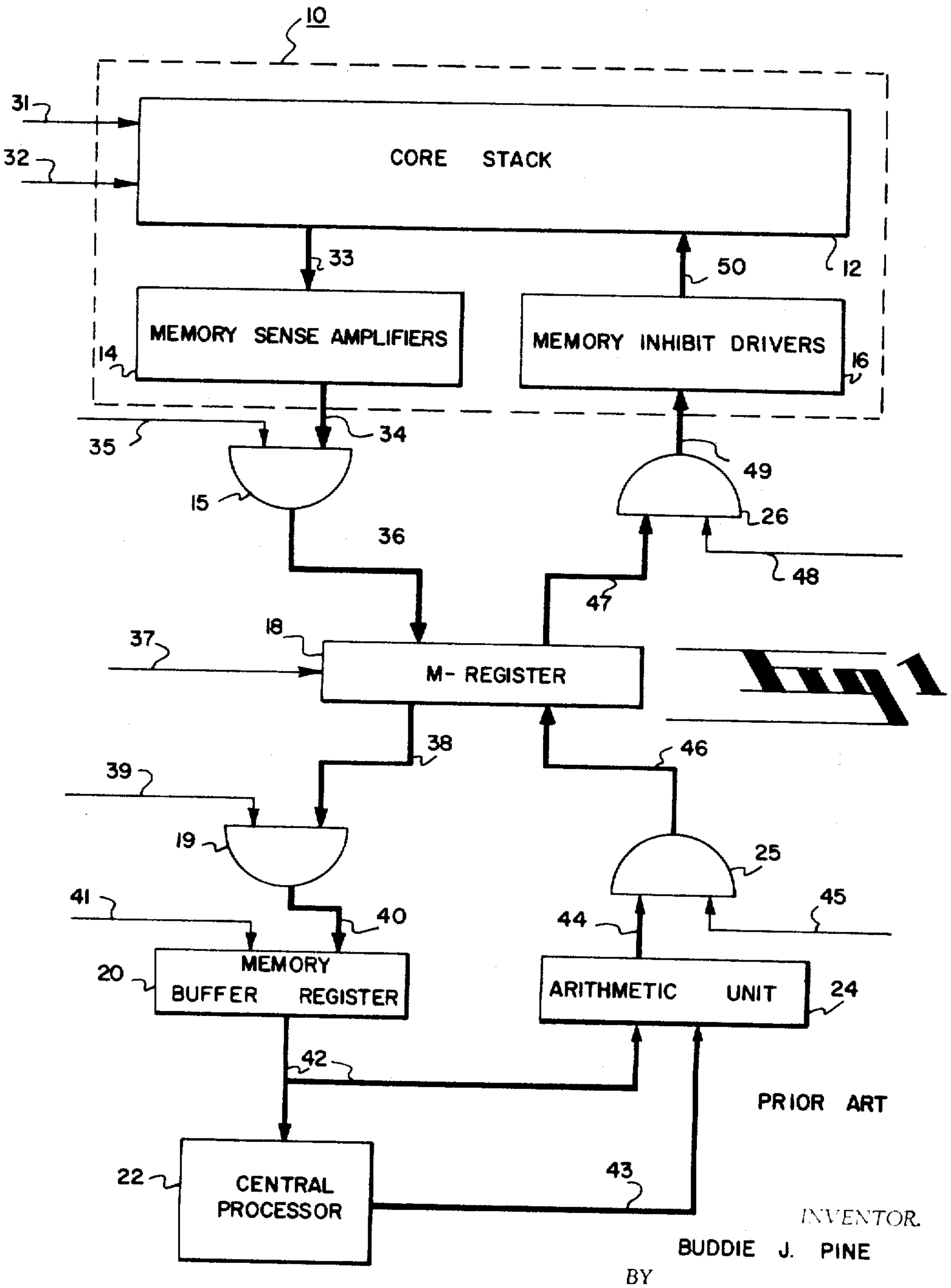

With specific reference now to FIG. 1, there is shown a typical memory system of the prior art. The system includes a main memory 10 which includes a core stack 12, memory sense amplifiers 14, and memory inhibit drivers 16. The system also includes a temporary memory or M-register 18 as well as a memory buffer register 20 and an arithmetic unit 24. The arithmetic unit 24 is to be illustrative of any data modifying means. The system also includes a central processor 22 and several logic elements connecting the various components of the system.

Figure 2:
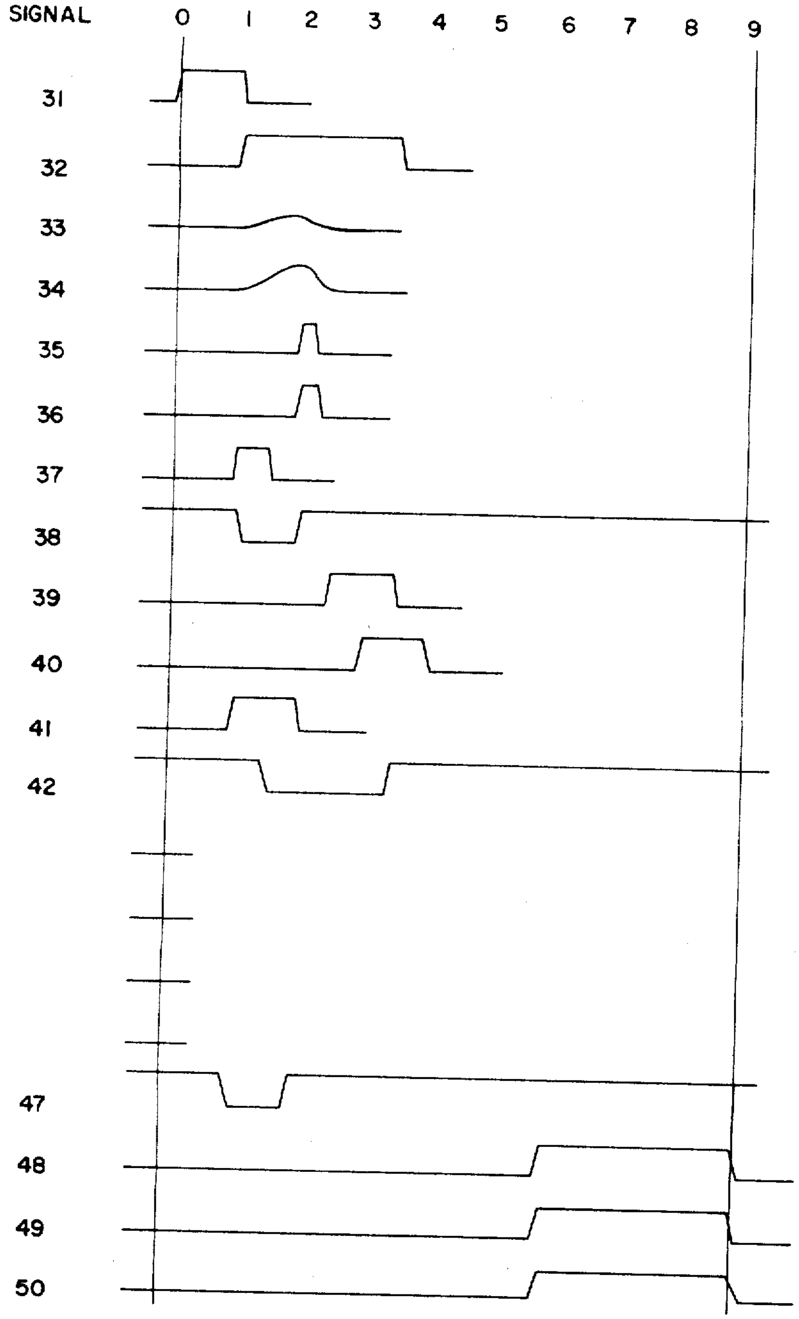
PRIOR ART FIG. 2
Figure 2B:
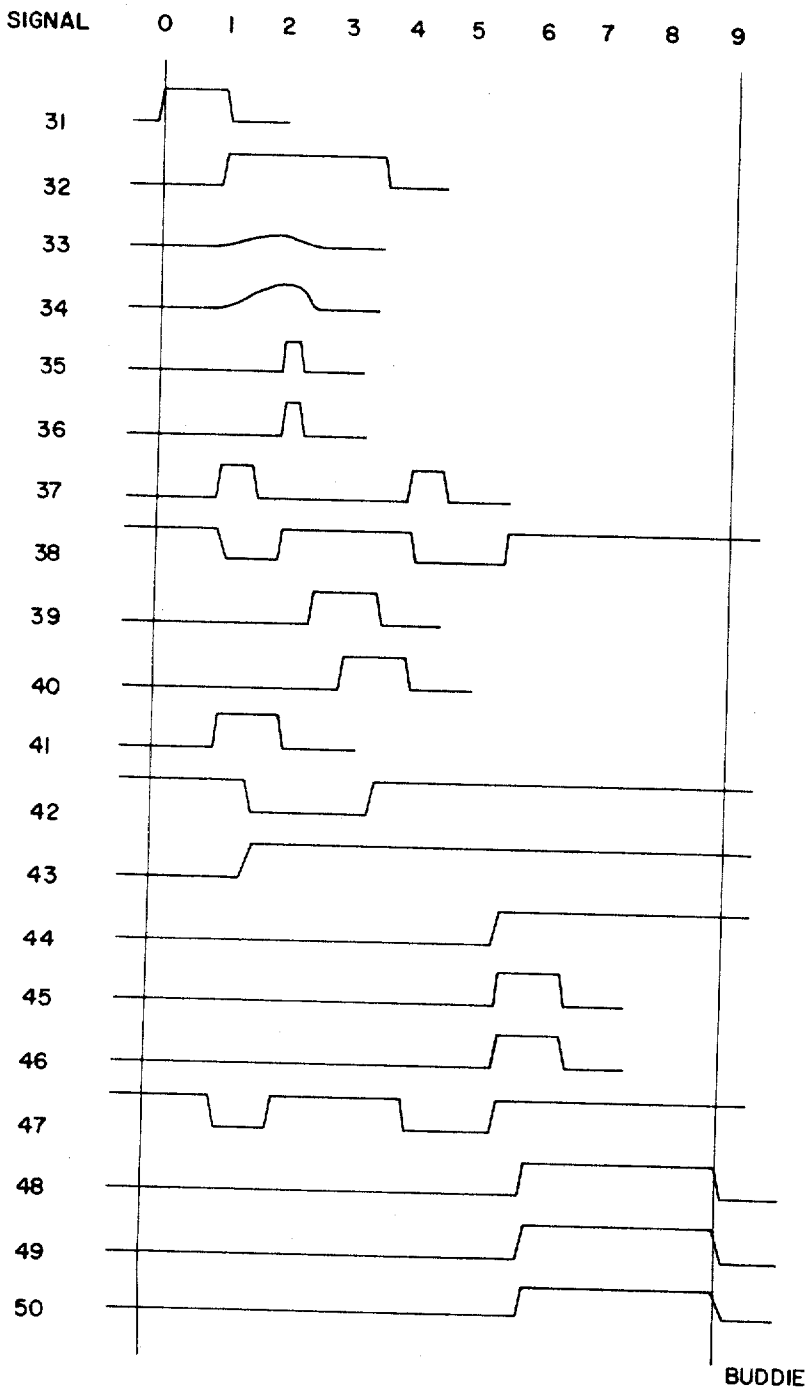
PRIOR ART Fig. 2b

The operation of the system of FIG. 1 may be understood with additional reference to FIGS. 2*a* and 2*b*. Insofar as is possible, the same characters which are utilized to designate the various data and control lines of FIG. 1 are also used to designate the representative signals shown in FIGS. 2*a* and 2*b*. For the sake of clarity, therefore, in the ensuing discussion, the explanation will be phrased in terms of data signals and control signals with the understanding that appropriate physical facilities are provided for the transmission of these signals.

The horizontal axis in the timing charts of FIGS. 2*a* and 2*b*, as well as in the subsequent timing charts (FIGS. 4 and 6), represents a time basis. In the present state of the art, the increments there shown are microseconds. However, it is understood that these time increments are by way of example to illustrate the proportional savings in time through the use of the present invention.

In the read-restore cycle (FIG. 2*a*) of the system of FIG. 1, when it is desired to read from the memory 10, i.e., to bring a data unit from memory, signals 31 and 32 are provided resulting in data unit output 33 (from the core stack 12) corresponding to the state of the cores which were addressed. Output 33 is amplified by the memory sense amplifiers 14 to provide signal 34 which is essentially an amplified reproduction of the data unit output 33. Signal 34 is applied as one input to a two input AND-gate 15. The second input to gate 15 is a trigger signal 35. Upon the concurrence of signals 34 and 35, the amplified data unit, now represented by signal 36, is gated into the M-register. (Prior to the insertion of the signal 36 into the M-register, however, the M-register must have been cleared. This clearing is accomplished by applying a reset signal 37 to the M-register. This signal 37 sets all of the cores of the M-register into the uniform state so that each may assume the state corresponding to its portion of the signal 36.) The M-register 18 now contains the data unit which was previously contained in the memory cell addressed by the signals 31 and 32. The contents of the M-register (the data unit being transferred) appear as a signal 38 which is applied as one input to a two input AND-gate 19. The second input to gate 19 is a trigger signal 39 and upon the concurrence of signals 38 and 39 the contents of the M-register are transferred to the buffer register 20. (The buffer register, like the M-register, must have been cleared prior to the insertion of a data unit thereinto. This clearing is achieved, in the present example, by the application of a reset signal 41 to the buffer register 20.) From the memory buffer register 20, the data unit is supplied to the central processor 22 under the control of that component. At approximately the same time that the contents of the M-register 18 are transferred to the buffed register 20, they are also supplied as a signal 47 which is conjunctively combined with a gating signal 48 in AND-gate 26 to form signal 49 which is applied to the memory inhibit drivers 16. From the inhibit drivers 16, the data unit, now represented as signal 50, is placed back into the core stack 12 in the cell from which it was originally taken.

In summary of the foregoing operation, a selected data unit is read from memory, supplied to the central processor and written back into memory at the cell from which it was taken. An inspection of the chart of FIG. 2*a* shows that the total operation time was approximately nine microseconds.

FIG. 2*b*, taken with FIG. 1, best explains the operation of the prior art memory system in the read-compute-write cycle. In this cycle, data is not only furnished to the central processor but is also acted upon by a data modifying means, such as an arithmetic unit, and the data, as modified by the arithmetic unit, is placed into the memory in the location from whence the original data came. In the read-compute-write cycle, a data unit is brought from the main memory to the memory buffer register in a manner identical to that previously described. The output 42 of the memory buffer register 20 is supplied to the central processor as before but in this instance it is also supplied to an arithmetic unit 24. The arithmetic unit 24 is also supplied with an information bearing signal 43 from the central processor which signal directs the modification to be effected on the data unit. The result of the two inputs 42 and 43 is an output 44 which is gated into the M-register through an AND-gate 25 by a gating signal 45. (As was the case when the data unit was initially placed in the M-register from memory, the M-register must again have first been cleared by a reset signal 37. This reset signal is shown as the right-hand pulse of line 37 of FIG. 2*b*.) The modified data unit is now supplied from the M-register to the main memory inhibit drivers 16 via AND-gate 26 when enabled by a timing trigger pulse 48. Thus, it is seen that in this mode of operation data signals are inserted into the M-register in each direction resulting in the previously discussed race condition which necessitates, in this example, the use of the memory buffer register 20. The actual time allotted to the arithmetic unit for its modifying function is in that interval between the rise of signal 42 and the rise of signal 45 (FIG. 2*b*). As shown, this time interval is approximately two microseconds.

From the foregoing explanation of the read-compute-write cycle of the prior art memory system, it is seen that from the leaving of the memory sense amplifiers to the insertion into the memory inhibit drivers, a selected data unit must pass through seven levels of logic exclusive of the arithmetic unit.

The present invention will be described with reference to FIGS. 3–6. In the discussion of the present invention, as far as is practical, the same reference characters as were earlier used will be used for those components having a counterpart in the prior art previously discussed. Essentially the same components are present with the present invention as were present with the prior art with the exception that the memory buffer register and its associated logic has been deleted. This deletion is possible because the present invention provides two separate and distinct paths for returning data to memory. The race condition which existed in the prior art does not exist with the present invention and, therefore, the memory buffer register is not necessary.

Figure 4:
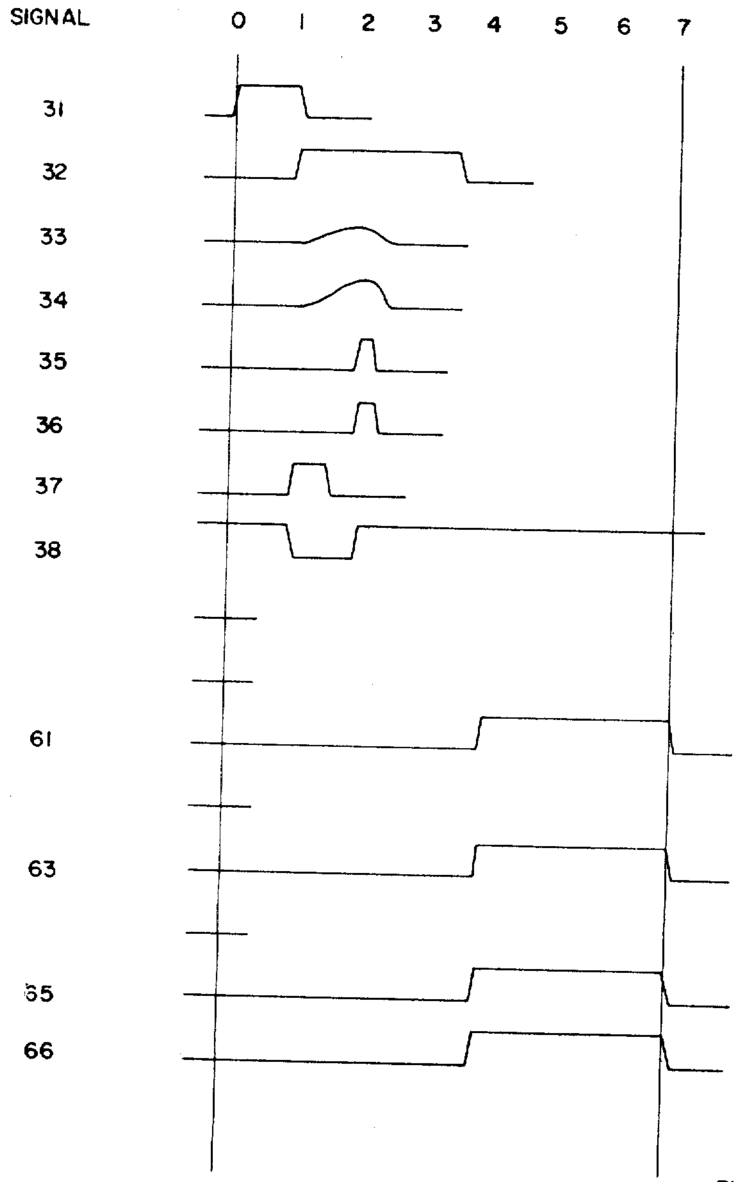
FIG. 4 is a timing diagram for FIG. 3.

Referring specifically now to FIG. 3 and the timing chart of FIG. 4, a data unit is brought from the core stack 12 of the memory 10, to the memory sense amplifiers 14 and into the M-register 18 in a manner identical to that with the prior art. In the read-restore mode of operation of the present invention, output 38 of the M-register 18 is applied to an AND-gate 70 to be conjunctively combined with a gating signal 61 to provide an output 63. Output 63 is one input to an OR-gate 72. Output 65 of the OR-gate 72 is applied to the memory inhibit drivers 16 to be reinserted as a signal 66 into the core stack. The mode of operation of the system of the present invention is essentially identical to that of the prior art read-restore cycle with the exception of one additional level of logic; namely, the OR-gate 72. However, even though an additional level of logic is provided in this mode, more than adequate time is available and this additional level does not here create a problem.

Figure 6:
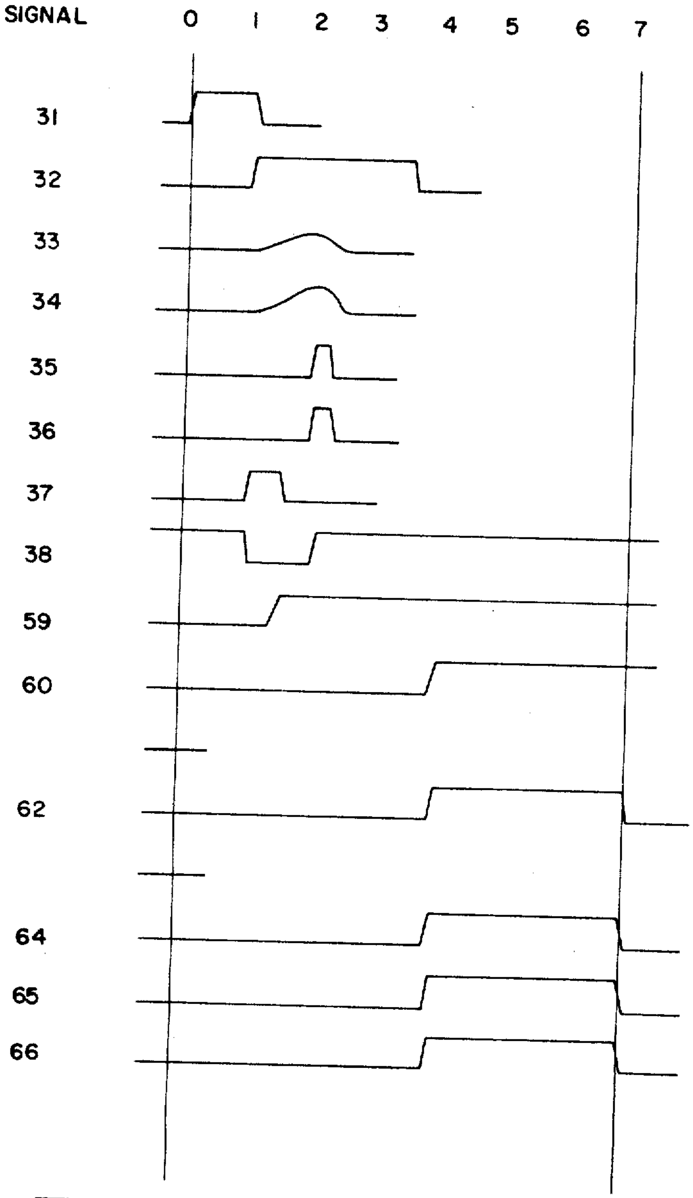
FIG. 6 is a timing diagram for FIG. 5.

The operation of the present invention in the read-compute-write mode of operation is best understood with reference to FIGS. 5 and 6. A data unit is brought from the core stack to the M-register in the identical manner as was done in both the prior art and the read-restore mode of operation of the present invention. In this case, however, the output 38 of the M-register is supplied to both a central processor 22 and a data modifying means 24. A second input to the modifying means 24 is a signal 59 from the central processor which serves to direct the modification to be effected on the data unit as it was supplied from the M-register 18. After being acted upon in in the modifying means, the data unit (signal 60), instead of being transferred back into the M-register, is conjunctively combined with a gating signal 62 in AND-gate 73. Output 64 of gate 73 forms an input to OR-gate 72, the output 65 of which is supplied to the memory inhibit drivers to form an input 66 to the core stack.

An inspection of the FIG. 6 timing chart shows that the time period allotted for the data modifying means to act upon the data unit supplied thereto extends from the rise of signal 38 to when the signal 62 is initiated. This corresponds to the elapsed time from when the data unit is applied to the modifying means to the time when the gating signal 62 is applied to the AND-gate 73 such that the data signal 60 is transmitted for subsequent entry into the core stack. This period of time, approximately two microseconds, is the same amount of time allocated to the prior art type of system. However, comparing the overall time required in the prior art and in the present invention (comparing FIG. 2*b* to FIG. 6), it is seen that whereas nine microseconds were required in the prior art system only seven microseconds are required with the present invention. This represents almost a twenty-nine percent savings in time over the prior art system. Comparing the apparatus implementation of the present invention to that of the prior art, it is seen that, excluding the data modifying means which is the same in both cases, whereas the prior art requires seven levels of logic, the present invention requires but four levels. Thus, there has been shown and described a memory system which is not only faster in operation than that known in the prior art but also results in a lesser amount of apparatus than was required in the prior art.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace all such modifications, within the limits only of the true spirit and scope of the invention.

What is claimed is:

1. In a data processing system, the combination comprising: a main memory, for the storage of a plurality of data units, comprised of a plurality of selectively addressable cells each of which is capable of storing one of said data units; a temporary memory; means coupled between said main memory and said temporary memory for transferring said data units from said main memory to said temporary memory; a first controllable data return path for providing communication directly from said temporary memory to said main memory; a second controllable data return path, including a data modifying means, for providing communication from said temporary memory to said main memory; and means for selectively rendering one of said data return paths operative.

2. In a data processing system, the combination comprising: a main memory, for the storage of a plurality of data units, comprised of a plurality of selectively addressable cells each of which is capable of storing one of said data units; a temporary memory; means coupled between said main memory and said temporary memory for transferring said data units from said main memory to said temporry memory; a first controllable data return path for providing communication directly from said temporary memory to said main memory; a second controllable data return path, including an arithmetic unit, for providing communication from said temporary memory to said main memory; and means for selectively rendering one of said data return paths operative.

3. In a data processing system, the combination comprising: a main memory, for the storage of a plurality of data units, comprised of a plurality of selectively addressable cells each of which is capable of storing one of said data units; a temporary memory; means coupled between said main memory and said temporary memory for transferring said data units from said main memory to said temporary memory; a first controllable data return path for providing communication from said temporary memory to said main memory; a second controllable data return path, including a data modifying means, for providing communication from said temporary memory to said main memory; and means responsive to first and second signals for selectively rendering, respectively, said first and said second data return paths operative.

4. A data processing system comprising a memory including a plurality of selectively addressable cells each capable of storing a unit of data; a register, capable of storing a unit of data, coupled to said memory; means responsive to a first signal for effecting the transfer of the unit of data of a selected one of said cells from said memory to said register; a first selectively operable data return path coupling said register to said memory; means responsive to a second signal for effecting a transfer of said selected unit of data from said register to said memory via said first data return path; a second selectively operable data return path coupling said register to said memory, said second data return path including a data modifying means; and means responsive to a third signal for effecting the transfer of said selected unit of data from said register to said memory via said second data return path including said modifying means.

5. A data processing system comprising a main memory including a plurality of selectively addressable cells each capable of storing a data unit; a temporary memory, capable of storing a data unit coupled to said main memory; means responsive to a first signal for effecting the transfer of the data unit of a selected one of said cells from said main memory to said temporary memory; first and second selectively operable data return paths coupling said temporary memory to said main memory; said second data return path including an arithmetic unit; said first and second data return paths respectively responsive to first and second signals for rendering one of said data return paths operable to effect the transfer of the data unit of the selected one of said cells from said temporary memory to said main memory.

6. A data processing system including a memory comprising a plurality of storage elements arranged in groups, each of said groups constituting a cell which is capable of storing a data unit; signal means for rendering each of said cells selectively addressable; a register capable of storing one of said data units; means interconnecting said memory and said register, said means responsive to a first control signal for effecting the transfer of a selected one of said data units from said memory to said register; a first data return path connecting said register to said memory comprising means responsive to a second signal for effecting the transfer of a data unit from said register into a selected cell of said memory, and a second data return path connecting said register to said memory, said second data return path including a data modifying means and means responsive to a third signal for effecting the transfer of a data unit from said register into said memory via said data modifying means.

7. A data processing system including a main memory comprising a plurality of storage elements divided into groups to form a plurality of data cells, each cell capable of storing a data unit; signal means for selectively addressing said data cells; a temporary memory capable of storing the data unit of a selected one of said cells; means interconnecting said main memory and said temporary memory, said means responsive to a first control signal for effecting the transfer of the data unit from a selectively addressed data cell in said main memory to said temporary memory; a central processor in communication with said temporary memory for receiving said data unit; a first data return path connecting said temporary memory to said main memory comprising means responsive to a second signal for effecting the transfer of a data unit from said temporary memory into a selected cell of said main memory, and a second data return path connecting said temporary memory to said main memory, said second data return path including a data modifying means and means responsive to a third signal for effecting the transfer of a data unit from said temporary memory to said main memory via said data modifying means.

References Cited

UNITED STATES PATENTS

| | | | |
|---|---|---|---|
| 3,013,251 | 12/1961 | Wright | 340—172.5 |
| 3,018,956 | 1/1962 | Hosier et al. | 340—172.5 X |
| 3,024,993 | 3/1962 | Wright et al. | 235—157 X |
| 3,108,256 | 10/1963 | Buchholz et al. | 340—172.5 |
| 3,118,131 | 1/1964 | Wright | 340—172.5 |
| 3,136,980 | 6/1964 | Matthews | 340—172.5 |
| 3,181,123 | 4/1965 | Wright et al. | 340—172.5 |

ROBERT C. BAILEY, *Primary Examiner.*

PAUL J. HENON, *Examiner.*